Oct. 6, 1959   J. W. DE LISLE NICHOLS ET AL   2,907,889
FOG DETECTING AND VISIBILITY MEASURING SYSTEMS
Filed Sept. 21, 1956   2 Sheets-Sheet 1

INVENTORS:
JOHN WINFRITH de LISLE NICHOLS
MICHAEL HEREWARD WESTBROOK

By: Stevens, Davis, Miller & Mosher
Attorneys

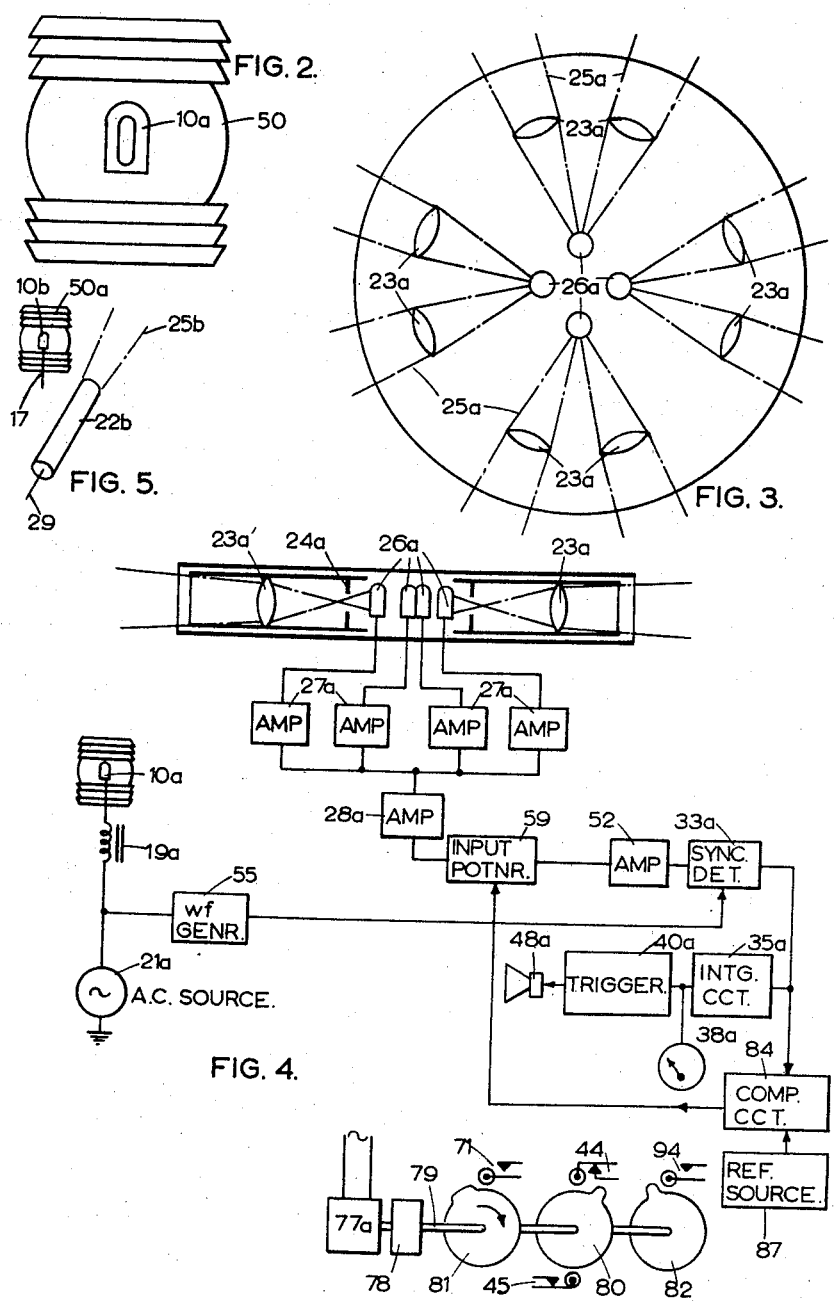

United States Patent Office 2,907,889
Patented Oct. 6, 1959

2,907,889

FOG DETECTING AND VISIBILITY MEASURING SYSTEMS

John Winfrith de Lisle Nichols, Godalming, and Michael H. Westbrook, Crayford, Dartford, England, assignors to National Research Development Corporation, London, England, a corporation of Great Britain Application September 21, 1956, Serial No. 611,156

Claims priority, application Great Britain September 23, 1955

20 Claims. (Cl. 250—217)

This invention relates to the measurement of visibility through the atmosphere, for instance, for indicating the presence and degree of density of fog or the like. A particular application of the invention is to an apparatus arrangement for indicating that visibility has fallen to a level such that marine type fog signals would normally be sounded and for automatically controlling the emission of such fog signals. The invention may also be used for measuring visibility objectively.

The operation of arrangements according to the invention is based upon the fact that light from a given source is, in part, returned towards that source by scattering and reflection from fog, mist, cloud and the like which obstructs visibility, the amount of light so returned being a function of the visibility range. The term "light" used herein is intended to include not only visible light but also all equivalent electromagnetic radiations from ultra-violet to infra-red.

In accordance with one aspect of the invention an arrangement for measuring visibility or detecting fog comprises a source of light, means for modulating the intensity of the light radiated by such source, at least one optical system located in the vicinity of such light source for receiving light from such source after scattering or reflection in fog or the like, said optical system being arranged so as normally not to receive light direct from said light source, photo-electric means for deriving an electric signal from light received by said optical system, the amplitude of said signal varying in accordance with the intensity of the received light, and means for examining said derived signal for the presence of a modulation corresponding to the modulation of said light source.

In a particular arrangement according to the invention the optical system, or each of the optical systems if more than one is provided, is/are arranged to receive light from a direction opposite or substantially opposite to a radiation direction of said light source.

Preferably the light radiated by said light source is modulated at a predetermined constant frequency. The means for examining the signal derived from the received light may then comprise one or more frequency selective amplifiers and/or synchronous detector means controlled by a modulation signal used for controlling the modulation of said light source.

In order that the invention may be more readily understood, a number of embodiments thereof will now be described in some detail and by way of illustrative example with reference to the accompanying drawings, in which:

Fig. 2 is an elevational view of the light source used in a second embodiment of the invention.

Fig. 3 is a diagrammatic plan view of a group of light-sensitive receiving devices forming part of such second embodiment.

Fig. 4 is a block schematic diagram of the arrangements of such second embodiment, while Fig. 5 is a schematic diagram illustrating a further embodiment.

Figure 1:
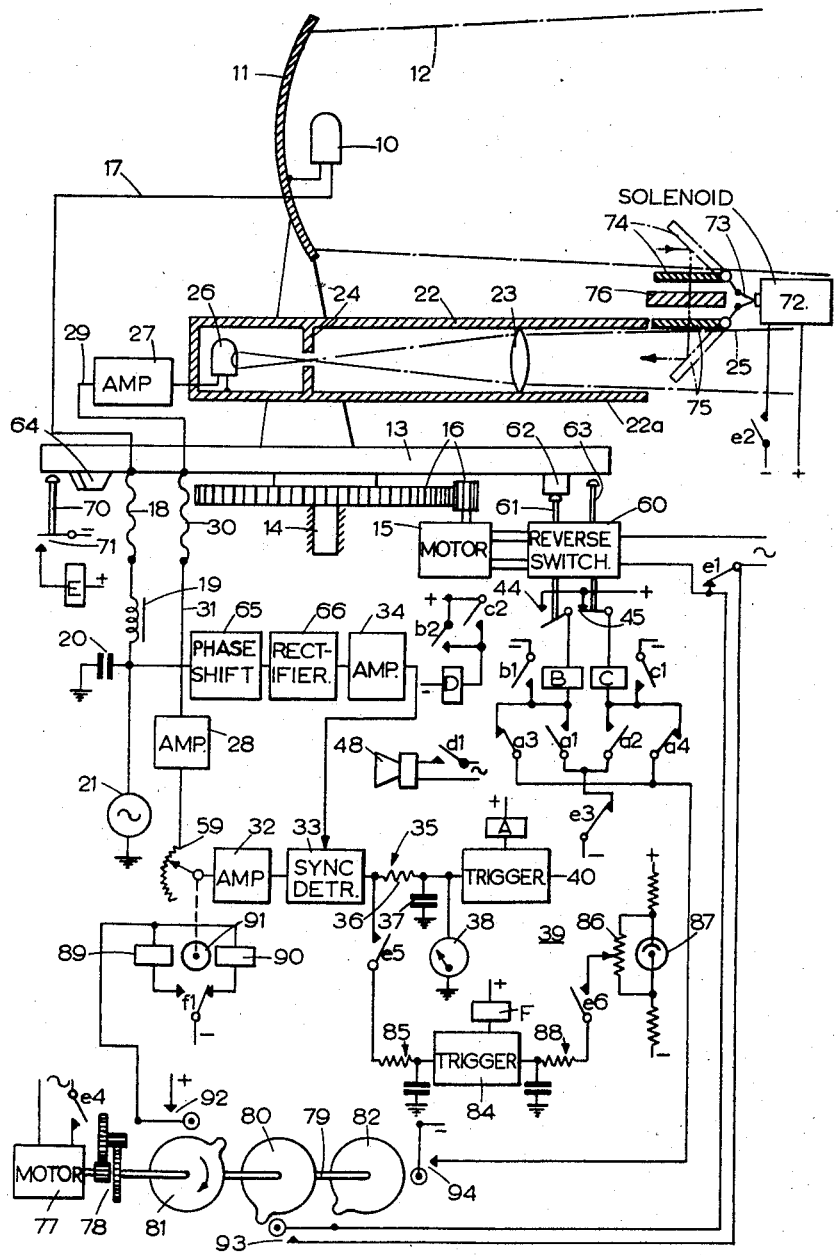
Fig. 1 is a block schematic diagram of one arrangement according to the invention for detecting fog and for controlling an associated fog signal.

Referring first to Fig. 1, the arrangement shown therein comprises a light source 10 associated with a reflecting mirror 11 designed to provide an outgoing light beam 12 having a divergence angle which is small in both horizontal and vertical planes. The light source 10 and mirror 11 are mounted upon a platform 13 arranged for rotation in a horizontal plane about the axis of a spindle 14 by means of a reversible electric motor 15 operating through speed-reduction gearing 16. The direction of rotation of the motor 15 is controlled by reversing switch means 60 adapted to be operated in one direction by the engagement of one operating rod 61 with an abutment 62 carried on the platform 13 at one angular position of the latter and to be operated in the opposite direction by the engagement of another operating rod 63 with a second abutment 64 carried on the platform 13 at a second and displaced angular position thereon. By such driving means the platform 13 may be caused to move backwards and forwards continuously between two predetermined angular positions set by the respective locations of the abutments 62, 64 and the beam 12 correspondingly swept to and fro repeatedly over a chosen azimuthal angle of up to 360°.

The light source 10 is of any convenient form, for instance, a gas-discharge lamp supplied with current over lead 17, flexible connector 18, ballast choke coil 19 and a power factor correcting capacitor 20 from an alternating current supply source indicated schematically at 21. The intensity of the light radiated in the beam 12 is accordingly modulated at twice the frequency of the source 21. The latter may conveniently be the public supply mains operating at a frequency of say, 50 cycles per second.

Associated with the light source 10 on the platform 13 is light-receiving means in the form of a telescope 22 which may be either of the reflecting type or, as shown, of the refracting type including an optical system of lens 23 and a stop aperture 24 for controlling the angle of convergence of the incoming light beam 25 effective upon a photocell 26. The angle of convergence of the received light beam is of similar order to the angle of divergence of the outgoing light beam 12 from the light source 10. The axes of the outgoing light beam 12 and incoming light beam 25 are parallel or substantially so whereby the telescope 22 receives light from a direction opposite or substantially opposite to that of the beam 12. In order that the light source beam 12 and the convergent beam 25 entering the telescope may be made as near parallel as possible, means for adjustment of the telescope relative to the light source beam are provided.

The telescope 22 is provided with an extension hood 22a to guard against illumination of the cell 26 by light from the source 10 or by the sun or other bright source of light. Suitable fixed light screens may additionally be employed in conjunction with the rotating platform 13 for the latter purpose.

The photocell 26, preferably of the vacuum type and operating with a low noise resistance as a load in order to keep the noise output level as low as possible, is mounted so that it may be brought to the focus of the optical system of the light-receiving telescope 22. The electric signal output from the photocell 26 is applied to a head amplifier 27 mounted closely adjacent the photocell and designed to have a good noise factor. The output from this amplifier is then fed by way of coaxial cable 29, flexible connectors 30 and further cable 31 to a selective A.C. amplifier 28 designed to have a narrow frequency passband centred on the modulation frequency of the light source 10. Such amplifier may incorporate a feed-back filter in order to provide the desired response characteristic.

The output from amplifier 28 is applied by way of an input signal control potentiometer 59 to a further amplifier 32 which is arranged to raise the signal level, without further band-width reduction, to a value sufficient to effect satisfactory operation of means for examining the signal for the presence of the modulation frequency of the light source 10, such means being in the form of a synchronous signal detector circuit 33 for which the amplifier output provides one input. This circuit 33 may be of any suitable conventional form, preferably of the half-wave type embodying a four-rectifier Cowan bridge circuit. The other or polarising signal input for the circuit 33 is derived from the A.C. supply source 21 by way of a phase shifting network 65, a full-wave rectifier circuit 66 and a further amplifier 34. The rectifier circuit 66 provides an output ripple frequency which is twice that of the source 21 and this, after amplification in the amplifier 34 which has a narrow frequency passband centred on the ripple frequency, provides a sine wave voltage of the same frequency as that of the modulation of the light source 10. The amplifier 34 is preferably made identical with the narrow band amplifier 28 whereby any phase-shift of signals passing through one is compensated by an equal phase-shift of signals passing through the other regardless of any variation of the frequency of the source 21.

The signal output from the synchronous signal detector circuit 33 is then fed to an integrating circuit 35 comprising resistor 36 and capacitor 37 arranged to have a very long time constant, for instance, of the order of 20 seconds. The output from such integrating circuit is employed to operate suitable indicating, recording or control means.

The apparatus operated by the output from the integrating circuit may comprise an indicating meter 38 for providing a continuous objective indication of visibility values and/or automatic control arrangements indicated generally at 39.

The automatic control arrangements shown comprise a trigger circuit 40 of, for instance, the well known Schmitt type. The trigger control input of this circuit is supplied with the output from the integrating circuit 35 while a relay A is arranged in the anode circuit of one of the trigger circuit valves so as to be operated when the input voltage rises to a predetermined level corresponding to the light input conditions calling for operation of an audible fog signal alarm. This relay A has contacts $a2$, $a2$, both closed when the relay is operated and contacts $a3$, $a4$, both closed when the relay is not operated. The contacts $a1$, $a2$ control, respectively, the initial energisation of two further relays B, C arranged with holding contacts $b1$, $c1$ and provided also with further contacts $b2$, $c2$ which each serve to provide a current supply path for operating a further relay D. The contacts $d1$ of such relay, closed when the relay D is operated, are arranged to control, in any convenient manner, the operation of an audible alarm device 48 consisting, for instance, of a marine type fog signal.

The current supply paths for the relays B and C each include a normally closed contact 44 or 45 respectively which is arranged to be opened momentarily by the associated operating rod 61, 63, one at one limit position of the traversing movement of the platform 13 and the other at the opposite limit position of such traversing movement.

Briefly, the manner of operation of the arrangements so far described is as follows. Assuming a 50-cycle A.C. supply source 21, the light source 10 is modulated at the rate of 100 cycles per second to emit a modulated light which is continuously radiated over the narrow angle beam 12 as the platform 13 is rotated, relatively slowly, in azimuth. With clear visibility such radiated light will not produce any effect upon the photocell 26 as none of the radiated light will be scattered or reflected to a sufficient extent at some remote position along the direction of the beam to return light to the receiving telescope 22. The only light input to the photocell is that of steady ambient light which will produce a D.C. output from the photocell. In order to keep the photocell output under these conditions within the photocell design limits, the stop aperture 24 of the telescope is designed to the appropriate size and the hood $22a$ and other masking screens are provided to limit the entry of light from the sun or any local source of light. Under such conditions the photocell output is principally D.C. with superimposed noise voltages. The D.C. component is effectively eliminated by the use of A.C. amplifier 28 while the effect of the noise voltage component in the cell output and the noise output of the associated amplifiers is kept to a minimum by the frequency band-width limitations referred to and by the use of the synchronous signal detector circuit 33. Under these conditions the output signal from the circuit 33 alternates positive and negative about a mean D.C. level and thus, when integrated over the relatively long period of time set by the time constant of the integrating circuit 35 no output is available to operate the meter 38 or to provide a triggering input to the trigger circuit 40.

If, however, the visibility range becomes lowered due, for instance, to the presence of fog or smoke, then there will be scattering or reflection of the light from the light source 10 at some distant point along the beam 12 and light will be returned towards such source and will enter the telescope 22 to become effective on the photocell 26. The resultant output from the photocell will obviously be a signal having a predominant frequency component of twice that of the supply source 21. This component of the photocell output, after passage through the amplifiers 27, 28 and 32 is presented as an A.C. input signal to the synchronous signal detector circuit 33. The polarising A.C. voltage supplied from amplifier 34 is adjusted by the phase shift circuit 65 to be in synchronism with the input signal from amplifier 32 and under these conditions an output is provided by the circuit 33 and is fed to the integrating circuit 35 and, after integration in the usual way, serves to provide a signal output whose amplitude value is indicated by the meter 38. Such output may or may not be of sufficient amplitude to trigger the trigger circuit 40 depending upon the intensity of the returned light which in turn is dependent upon the density and range of the fog or other conditions causing reflection or scattering of the light from the source 10. Adjustment of the standing bias level of the cathodes of the valves of the trigger circuit 40 may be used to ensure that the automatic control function is provided at some required and predetermined visibility condition.

The purpose of the arrangement of relays A, B, C and D is to ensure that, once operated, the audible alarm will continue to sound for at least the period of one traverse of the platform 13 so ensuring that, even if the visibility is reduced in one direction only of the arc of supervision, the signal will continue to sound for as long as this reduced visibility persists. Thus, if at some intermediate direction of the arc of supervision, fog of audible warning density is detected during a clockwise traverse movement of the platform 13, the trigger circuit 40 will be operated at that instant to operate relay A thereby closing contacts $a1$, $a2$. This, in turn, operates both relays B and C which lock-up by way of their holding contacts $b1$, $c1$. Relay D is accordingly operated and the audible alarm sounded. Relays B and C remain operated even if relay A becomes de-energised again owing to the beam 12 being directed to an improved visibility zone following continued movement of the platform 13. At the limit of the aforesaid clockwise traverse movement of the platform 13, operating rod 61 will be depressed by abutment 62 to reverse the motor 15. At the same instant switch contact 44 will be opened momentarily to release relay B. Relay C, however, is not released at this time but remains energised until the operating rod 63 is depressed and switch contacts 45 opened when the platform 13 reaches the opposite limit of its traverse in the anticlockwise direction. In consequence the audible alarm device 48 is continuously operated until this time. If during the reverse or anticlockwise traverse the reduced visibility conditions are again encountered, the trigger circuit 40 will again have been operated and the resultant operation of relay A will have again operated relay B (relay C is, of course, already operated). In consequence the release of relay C at the end of the anticlockwise traverse will not release relay D and the alarm will continue to sound. If, on the contrary, the reduced visibility conditions have disappeared, then the release of relay C at the end of the anticlockwise traverse will result in the release of relay D and the suspension of operation of the audible alarm device 48.

The speed of rotation of the platform 13 is determined by the permissible time lag in initiating a warning or giving a visibility measurement; a convenient rate for fog detection is one traverse movement in five minutes.

Means are also provided for effecting a periodic test of the operational efficiency of the apparatus and for making any necessary compensating adjustment, for instance, of the gain value of one of the amplifiers forming part of the means for deriving the output signal applied to the integrating circuit 35.

Such means comprise a further operating rod 70 adapted to be engaged by one of the abutments 62, 64 at some convenient point of the traversing movement of the platform 13, e.g. at the mid point of each traverse. Depression of this operating rod 70 causes closure of contacts 71 to energize a relay E and the operation of its contacts $e1$, $e2$, $e3$, $e4$, $e5$ and $e6$. Contacts $e1$ open the current supply circuit to motor 15 and arrest movement of the platform 13. Contacts $e2$ close a current supply to a solenoid 72 and cause, through linkage 73, the rocking movement of two mirrors 74, 75 into the dotted line position whereby a proportion of the light from the light source 10 is reflected directly back into the telescope 22 through light filtering means 76. This produces an artificial or test signal whose amplitude, adjusted by means of the filter 76, is normally sufficient to operate the trigger circuit 40. Provided it was not already operating before the test operation, the audible alarm device is prevented from being operated at this time by the simultaneous opening of contacts $e3$ in the energising circuit of relays B and C. At the same time contacts $e4$ close a current supply to a further motor 77 which drives through a reduction gear train 78 a one-revolution cam shaft 79 having cams 80, 81 and 82 secured thereon. In addition, contacts $e5$ close to connect the output of the detector circuit 33 to one triggering input of a trigger circuit 84 through an integrating circuit 85 similar to the integrating circuit 35 while contacts $e6$ also close to connect a reference input signal of predetermined value, set by adjustment of potentiometer 86 and derived from a constant voltage source 87, to the opposite triggering input of the trigger circuit 84 through another integrating circuit 88 similar to the integrating circuit 85. A relay F in the anode circuit of one of the valves of the trigger circuit controls change-over switch contacts $f1$ which govern the supply of current to one or other of the two operating coils 89, 90 of a reversible step-by-step switch 91 of the uniselector type. This switch is arranged as the potentiometer 59 controlling the input signal to the amplifier 32. The supply path for the selected operating coil 89 or 90 is by way of a further contact 92 momentarily closed by the cam 81 as the cam shaft 79 nears the completion of its one-revolution cycle. The cam 80 controls further contacts 93 connected in parallel with the contact $e1$ whereby the said contacts 93 are closed just as the cam shaft completes its one-revolution cycle. The cycle time of such cam shaft is of the order of, say, 40–50 seconds. The cam 82 controls further normally-open contacts 94 which are in a current supply path through contacts $a3$ and $a4$ of relay A to the operating coils of relays B and C respectively. These latter paths constitute alternative means for operating relays B and C, and hence the alarm device 48.

In the operation of these test arrangements, upon arrest of the platform 13 and the commencement of rotation of the cam shaft 79, the artificial or test signal output from circuit 33 is applied over contacts $e5$ to the integrating circuit 85 whereby the left hand input to the trigger circuit 84 commences to rise. Simultaneously, the application of the chosen reference voltage from potentiometer 86 through contacts $e6$ to integrating circuit 88 causes the right hand input to trigger circuit 84 to rise also. Depending upon the previous setting state of such trigger circuit and the relative rates of voltage rise at the outputs of the two integrating circuits, the trigger circuit may or may not be reversed in its setting. Thus, if the trigger circuit is already in the state where the relay F is energised, a faster rise of the output from the integrating circuit 85 than that from integrating circuit 88 (indicative that the test signal is above the reference level) will cause the trigger circuit state to be reversed. Conversely, if the trigger circuit is initially in the opposite state with relay F de-energised, a slower rise of the output from integrating circuit 85 compared with that from integrating circuit 88 will also cause the trigger circuit to be reversed. The position of the change-over contacts $f1$ is governed by the state of relay F; if such relay is operated, the coil 89 is connected in circuit to cause the movement of the slider of potentiometer 59 towards a position of increased signal input to amplifier 32 whereas if relay F is de-energised the coil 90 is connected in circuit to cause opposite movement of the slider of the potentiometer 59 towards a position of decreased signal input. The step-by-step switch 91 connected to the slider of the potentiometer 59 is operated one step in one or other of the two alternative directions by the momentary closure of cam-controlled contacts 92 towards the end of each test period.

Thus, if the output from circuit 33 is below the reference level set by the potentiometer 86 the trigger circuit 84 will either be set, or will remain set in the state where relay F is operated and coil 89 is employed to increase the signal input to amplifier 32. If such increase is found insufficient at the next test period, the potentiometer 59 is moved yet a further step and so on. In the case of excessive test signal output a converse operation takes place.

The test signal output from integrating circuit 35 should always operate the trigger 40 although, as already stated, the audible alarm is not sounded. Failure to operate the trigger circuit 40 is regarded as a fault and at a time instant sufficiently delayed from the commencement of the test period to allow the output from the integrating circuit 35 to build up to its proper level, the momentary closure of cam-controlled contacts 94 tests whether contacts $a3$, $a4$ of relay A have been opened. If relay A is not operated, the relays B and C are energised and lock-in in the usual way to sound the audible alarm device 48.

Such checking and compensating arrangements operate to eliminate the effects of changes in the light output of the source 10, obscuration of the mirror 11 or optical system 23 and changes in sensitivity of photocell 26 or circuits 27, 28, 32 and 33.

In the second embodiment shown in Figs. 2, 3 and 4 the use of a moving platform or like means in order to provide supervisory coverage over a wide angle is avoided. In this embodiment, the light source shown in Fig. 2 comprises a lamp 10a, which may again be of the gaseous discharge type, in a fixed position and surrounded by a cylindrical lens 50 by which the light is concentrated into a narrow flat beam having a small angle of divergence in a vertical plane and a relatively large angle of divergence, for instance, 360°, in a horizontal plane, so as to extend in all of the desired directions of supervision around the source.

A group of fixed light receiving devices are employed and, as shown in Fig. 3, comprise a central group of four photocells 26a surrounded by eight optical systems which are virtually telescopes and are hereafter so called. These telescopes are indicated diagrammatically by lenses 23a. Each of the photocells is arranged to receive light from two telescopes directed in divergent directions.

Each telescope is arranged to receive light approaching within a narrow beam having a convergence angle in a vertical plane which is comparable with the vertical divergence angle of the outgoing beam from the light source 10a. The horizontal convergence angle of the approaching light to each telescope is small in relation to the large horizontal angle of divergence of the said outgoing beam from the light source 10a.

The light reception zones of the various telescopes preferably do not overlap but are made as far as possible contiguous so as to embrace, in combination, a light reception angle in the horizontal plane which is approximately coincident with the corresponding angle of divergence of the outgoing light beam.

It is desirable to use as few photocells as possible to limit the cost and complexity of the electronic apparatus but it is also desirable to have a sufficient number of telescopes to ensure a representative sample of the reflected light from around the arc of supervision energised by the light source. The arrangement illustrated has been found to be a satisfactory compromise. Multiplication of the number of telescopes aimed at one photocell necessitates a reduction of the quantity of light admitted through each to avoid over-illumination of the photocell.

Wide horizontal shields may be provided close to, and above, and below, the assembly of light-receiving telescopes to prevent direct access of light to them from the light source 10a or from other fixed local sources.

Referring now to Fig. 4, the lamp 10a is supplied with current derived from the alternating current source 21a, conveniently the public supply mains, through a choke 19a. As both positive and negative half-cycles serve to energise the lamp the emitted light is intensity-modulated at twice the frequency of the source.

As shown in Fig. 4, a separate head amplifier 27a is provided for each photocell 26a, the outputs of these amplifiers being then combined and applied to a common A.C. amplifier 28a. The output of this amplifier 28a is further amplified by a selective amplifier 52 also having a narrow width pass-band centred on the light source frequency. The output of amplifier 52 is passed to a synchronous or coherent signal detector circuit 33a in which the incoming signal is combined with locally produced oscillations of the same frequency which may be obtained from the alternating current source 21a.

As in the previous embodiment, the pulsating unidirectional output of the detector circuit 33a is applied to an integrating circuit 35a having a time constant of several minutes whereby a steady output voltage is obtained from such integrating circuit. This long time constant also ensures that the output will not rise to the predetermined level chosen for the operation of the alarm system in the event of a temporary rise in the level of the received light by reflection from some passing object (for instance a ship, where the apparatus is in a coastal station).

The output of the integrating circuit 35a is passed, as before, to a meter 38a from which a continuous objective indication of visibility is obtainable and also to a trigger circuit 40a which may again be of the Schmitt type biased to be triggered when the input signal thereto reaches a level corresponding to a predetermined level of visibility chosen for the operation of the alarm. The trigger circuit output may be arranged to operate a relay, the contacts of which energise a fog signal or the like as indicated schematically at 48a.

To produce the local oscillations for the synchronous signal detector circuit 33a, current from the A.C. supply source 21a is applied, as in Fig. 1, to a waveform generator 55 which conveniently comprises a phase adjustment network followed by a full-wave rectifier circuit followed in turn by a selective amplifier, preferably a replica of the selective amplifier 52, having a narrow frequency pass-band centred on the ripple frequency of the associated full-wave rectifier circuit which frequency, being twice that of the input source 21a, is the same as the modulation frequency of the light radiated from the lamp 10a. The filtered ripple frequency from the rectifier circuit is amplified and the output, a sine wave of twice the mains frequency (the D.C. component being removed), is applied to the detector circuit 33a as the polarising input.

When the supply mains are used in this way, stringent precautions must be taken against the injection of the second harmonic of the mains frequency into the cables and circuits by direct induction, power pack ripple, pick-up from valve cathode heater supplies or the like. H.T. supplies must be smoothed to a high standard, and if the cathode heater supplies are derived from the same supply as the lamp 10a, they must be rectified and smoothed to D.C. Any signal-carrying cables should be screened, and careful attention should be paid to the layout and screening of circuit components to avoid hum pick-up. Any such injection of the second harmonic of the supply mains frequency would produce a spurious signal indistinguishable from that due to the outputs of the photocells 26a.

As the permissible illumination intensity of a photocell is limited, care must be taken that the illumination due to ambient light plus the intensity maxima of the light source after reflection, do not exceed this permissible illumination intensity. So far as the receiving devices are concerned, this is the main limitation on the convergence angle of the field of view of the telescopes.

This embodiment also comprises arrangements for effecting checking and automatic gain control similar to those used in the moving system of Fig. 1, the test period being initiated at fixed time intervals and controlled during each period by timing means shown schematically as a synchronous motor 77a and cam-shaft 79a.

A further and simplified embodiment suitable for controlling the operation of an alarm signal by the atmospheric conditions in the proximity of the light source is shown in Fig. 5. In this embodiment a light source 10b, conveniently surrounded by a cylindrical lens 50a, is employed and a single telescope 22b is directed so that its convergent beam 25b is just sufficiently displaced from the source 10b to avoid intercepting any light from the latter directly. Only when fog conditions surround the light source 10b with the consequent scattering and reflection of its output light is the output from the photoelectric means associated with the telescope 22b caused to initiate the required alarm signal. The detailed arrangments are not shown as they may be similar to those of the earlier embodiments.

Various modifications may obviously be made without departing from the scope of the invention. For instance, the arc of supervision may be made one of 360° with appropriate modification of the arrangements of Fig. 1 for effecting continuous rotation of the light beam 12 and telescope 22 in one direction. Similarly, limitation of the horizontal divergence angle of the light beam and the corresponding reduction of the number of telescopes in the embodiment of Figs. 2–4 may be made to deal with a restricted arc of supervision. The invention may also be used for supervision in a plane other than horizontal or even with a fixed narrow angle light beam and associated optical system. Other forms of circuit devices for examining the signal derived from received light for the presence of a modulation corresponding to that of the radiated light may also be used. The radiated light beam may form, in itself, a warning or identification signal.

We claim:

1. An arrangement for measuring visibility or detecting fog, which comprises a source of light, means for modulating the intensity of the light radiated by such source at a single frequency, at least one optical system located in the vicinity of said light source for receiving light from a direction opposite or substantially opposite to a radiation direction of said light source, photo-electric means for deriving an electric signal from light received by said optical system, the amplitude of said signal varying in accordance with the intensity of the received light, signal examining means for examining said derived signal for the presence of a modulation component corresponding to said frequency of modulation of said light source, said signal examining means providing an output signal proportional to the amplitude of said modulation component of said examined signal, and indicator means responsive to changes of amplitude of said output signal.

2. An arrangement according to claim 1 in which modulation of the light from said light source is effected at a predetermined constant frequency.

3. An arrangement according to claim 2 in which said light source comprises means for radiating a light beam having a small angle of divergence in both horizontal and vertical planes and in which said optical system consists of a telescope having a similar small angle of convergence in both horizontal and vertical planes.

4. An arrangement according to claim 3 which includes means for moving said light source and said telescope in unison so as to sweep repeatedly through a predetermined azimuthal angle.

5. An arrangement according to claim 4 in which said light source and said telescope are mounted upon a common support which is arranged for continuous rotation in azimuth.

6. An arrangement according to claim 2 in which said light source comprises means for radiating a light beam having a small angle of divergence in a first plane and a relatively large angle of divergence in a second plane at right angles to said first plane.

7. An arrangement according to claim 6 in which said light source is stationary and in which said angle of divergence in said second plane is sufficient to embrace the arc over which supervision is required.

8. An arrangement according to claim 7 in which the angle of divergence in said second plane is 360° to provide a narrow flat light beam extending in all directions around said source.

9. An arrangement according to claim 8 in which said first plane is a vertical plane and in which said second plane is a horizontal plane.

10. An arrangement according to claim 6 which comprises a plurality of said light receiving optical systems each situated in fixed position in the vicinity of said light source and each constructed to receive light approaching it through a small angle of convergence in said first plane comparable to said small angle of divergence of said light beam in said first plane and through an angle of convergence in said second plane which is small in relation to said relatively large angle of divergence of said light beam in said second plane.

11. An arrangement according to claim 10 in which the light reception zones of said optical systems do not overlap but are substantially contiguous so as to embrace, in combination, a light reception angle in said second plane which is approximately coincident with said large angle of divergence of said light beam in said second plane.

12. An arrangement according to claim 2 which includes an alternating current amplifier having a narrow frequency pass band centred on said light source modulation frequency for amplifying the signal derived from said photo-electric means before application to said signal examining means.

13. An arrangement according to claim 12 in which said signal examining means includes a synchronous signal detector circuit controlled by a voltage derived from the modulation applied to said light source.

14. An arrangement according to claim 13 in which the output from said detector circuit is applied to an integrating circuit having a time constant which is very long with relation to the period of time of the modulation frequency.

15. An arrangement according to claim 1 which includes automatic control means for an audible fog signal, said control means being operated by said output signal derived from said signal examining means.

16. An arrangement according to claim 1 which includes indicating or recording means operated by said output signal derived from said signal examining means for providing continuous objective indication of visibility value.

17. An arrangement according to claim 1 which includes means for effecting a periodic test of the operational efficiency of the apparatus.

18. An arrangement according to claim 17 in which said testing means includes apparatus for comparing the amplitude of said derived signal with a reference signal of predetermined amplitude and for adjusting the gain value of an amplifier forming part of said photo-electric signal deriving means in a sense tending to maintain said derived signal during the periods of said periodic tests at a constant predetermined amplitude value.

19. An arrangement for measuring visibility which comprises a source of light, means for modulating the intensity of the light radiated by such source at a predetermined single frequency, at least one optical system located in the vicinity of said light source for receiving light from said light source after scattering or reflection in fog or the like, said optical system being arranged so as normally not to receive light direct from said light source, photo-electric means for deriving an electric signal from light received by said optical system, the amplitude of said signal varying in accordance with the intensity of the received light, signal examining means for examining said derived signal for the presence of a frequency component corresponding to said single modulation frequency of said light source, said examining means providing an output signal proportional to the amplitude of said frequency component, and indicating means operated by said output signal of said examining means for providing a visibility measurement indication variable in accordance with variation of the amplitude of said modulation frequency component of said derived signal.

20. An arrangement for detecting fog which comprises a source of light, means for modulating the intensity of the light radiated by such source at a predetermined single frequency, at least one optical system in the vicinity of said light source for receiving light from said light source after scattering or reflection in fog or the like, said optical system being arranged so as normally not to receive light direct from said light source, photoelectric means for deriving an electric signal from light received by said optical system, the amplitude of said signal varying in accordance with the intensity of the received light, signal examining means for examining said derived signal for the presence of a frequency component corresponding to said single modulation frequency of said light source, said examining means providing an output signal proportional to the amplitude of said frequency component, and warning means operated by said output signal of said examining means when the amplitude of said modulation frequency component of said derived signal exceeds a predetermined minimum value.

References Cited in the file of this patent

UNITED STATES PATENTS

| | | |
|---|---|---|
| 2,032,588 | Miller | Mar. 13, 1936 |
| 2,081,134 | Buckley | May 25, 1937 |
| 2,730,654 | Rabinow | Jan. 10, 1956 |
| 2,788,702 | Baum | Apr. 16, 1957 |

FOREIGN PATENTS

| | | |
|---|---|---|
| 630,490 | Great Britain | Oct. 14, 1949 |